Figure 1:
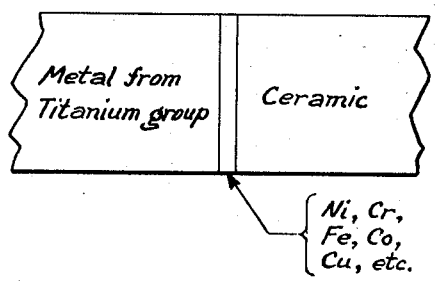

Oct. 28, 1958  J. E. BEGGS  2,857,663
METALLIC BOND
Filed Feb. 9, 1954

INVENTOR.
James E. Beggs,
BY Paul A. Frank
His Attorney.

United States Patent Office 2,857,663
Patented Oct. 28, 1958

2,857,663

METALLIC BOND

James E. Beggs, Schenectady, N. Y., assignor to General Electric Company, a corporation of New York Application February 9, 1954, Serial No. 409,159

5 Claims. (Cl. 29—473.1)

The present invention relates to an improved bond and method of bonding non-metallic refractory members to metal members as well as non-metallic refractory members to non-metallic refractory members.

Prior to the present invention it has been difficult to bond non-metallic refractory members together or to metallic members due to the fact that few materials have been known which will satisfactorily wet both members. One solution to this problem has been advanced by Floyd C. Kelley in his patent for Method of Metalizing and Bonding Nonmetallic Bodies, Serial No. 2,570,248, patented October 9, 1951, and assigned to the assignee of this invention. In accordance with the method described in this patent, a mixture including titanium hydride and a solder metal such as copper, silver or gold is applied to the member to be metalized or bonded and the hydride dissociated by the application of heat in the presence of solder metal. When heated, the titanium wets the body and the solder flows over the areas which were painted with the titanium hydride mixture. The heating is preferably done in non-oxidizing atmospheres such as pure dry hydrogen or in vacua.

Even when this method is used, it is sometimes difficult to obtain a uniform coating of the titanium hydride and powdered solder metal on the parts to be bonded. The result of a non-uniform coating of titanium hydride and powdered solder is a joint of non-uniform thickness. This results in a pervious or relatively weaker point and, in the case of vacuum tube construction, may result in evaporation of solder which may cause poisoning or damage to the interior of the tube structure. Moreover, when seals are made in vacua, the hydrogen liberated when the titanium hydride is heated, must be pumped off. Thus, particularly in the case of vacuum tube construction, an additional pumping off or gas getting action is necessary.

It is, therefore, an object of my invention to provide a bond and method of bonding non-metallic refractory materials together as well as to metal members, said bond being of uniform thickness.

Another object of my invention is to provide a bond and method of bonding non-metallic refractory materials to non-metallic refractory materials as well as to metal which does not require the presence of a soldering flux.

A further object of my invention is to provide a bond and method of bonding non-metallic refractory materials to non-metallic refractory materials as well as to metal which does not require the removal of gases during the bonding process.

A still further object of my invention is to provide a hermetically tight bond between non-metallic refractory members as well as between non-metallic refractory members and metal members which comprises an alloy of metals such as titanium, zirconium, hafnium and thorium and a metal, which forms a eutectic liquidus at a temperature below the individual melting points of any of the alloyed metals, and at a temperature below the temperature at which said non-metallic refractory becomes soft and at which the sublimation rates of members and alloyed metals are low.

An additional object of my invention is to provide a method of bonding non-metallic refractory material to non-metallic refractory material as well as to metal with an alloy which utilizes at least one shim of a component metal of the alloy inserted between the members to be bonded together.

It is also an object of my invention to provide a bond for joining together two members, at least one of which is a non-metallic refractory, which bond has a thermal coefficient of expansion approximately the same as the thermal coefficient of expansion of the members.

My invention relates to a bond and method of bonding together non-metallic refractory parts as well as the bonding together of refractory non-metallic parts to metallic parts. This bond is formed by placing at least one shim of metal such as a piece of foil in contact with the parts to be bonded together, heating to a temperature at which a eutectic liquidus is formed of at least one metal from the titanium group and an alloying metal such as copper, nickel, molybdenum, platinum, cobalt, chromium or iron, hereinafter referred to as an alloying metal, and then allowing the liquidus to solidify thereby forming a bond. The bonds of my invention are alloys of metals from the titanium group. Metals of the titanium group are those metals in group IVb of a standard periodic table and include titanium, zirconium, hafnium and thorium. An alloying metal is, for the purposes of this specification, any metal or metal alloy which in combination with a metal from the titanium group forms a eutectic alloy at a temperature below the melting temperature of any one of the component metals.

Figure 4:
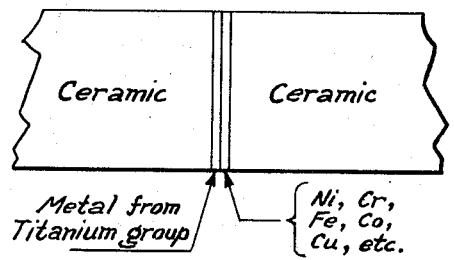
Figure 5:
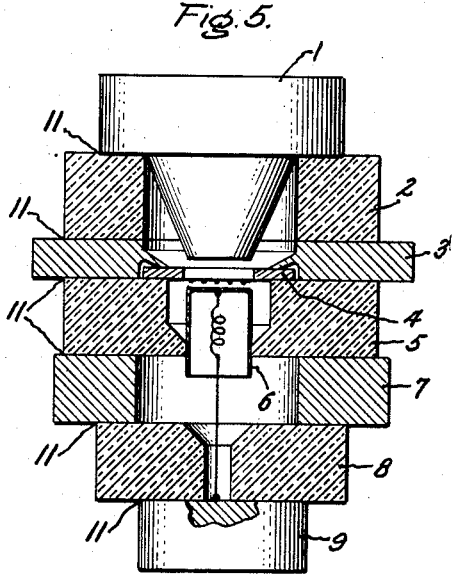

In the drawing, Figs. 1, 2, 3 and 4 are illustrative examples of bonds that may be formed by the method of my invention and Fig. 5 shows a miniature vacuum tube constructed in accordance with my invention.

Referring to Fig. 1 of the drawing, a titanium metal or zirconium metal member may be bonded to a non-metallic refractory member by placing between the parts a thin shim of alloying metal. For example, a titanium tube member may be bonded to a ceramic tube member by placing a 0.3 mil nickel shim between the members. The members are then held in contact and heated to the melting point of a nickel and titanium eutectic alloy which is approximately 955° C. The members are held at this temperature until a eutectic liquidus is formed and then are allowed to cool.

Figure 2:
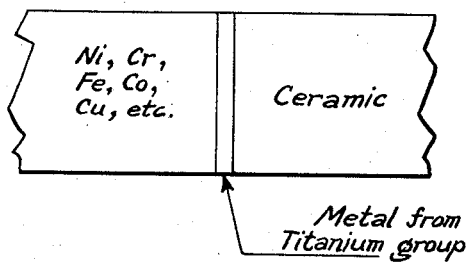

Members of alloying metal may be similarly joined to non-metallic refractory members by placing a thin foil shim of a titanium group metal between the parts to be bonded together. A bond of this type is illustrated in Fig. 2 of the drawing.

Figure 3:
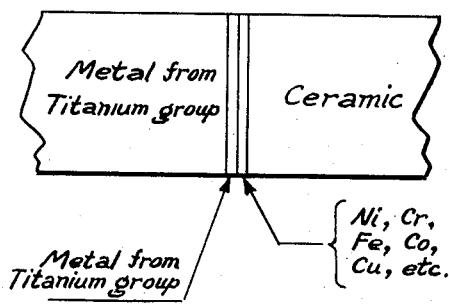

Very successful bonds between metal parts and ceramic parts have also been obtained by placing two foil shims between the parts to be bonded together as illustrated in Fig. 3 of the drawing. In this bond, the bonding alloy consists of both zirconium and titanium as well as one of the alloying metals. The advantage of a combination of titanium and zirconium is that the formation of the eutectic liquidus occurs at a lower temperature than that obtained when zirconium or titanium is used alone. Satisfactory results may also be obtained by using a shim of an alloy of zirconium and titanium rather than separate shims of zirconium and titanium. The thickness of the shim material is selected so that all of the shim material will alloy to form the desired amount of eutectic liquidus between the members to be bonded together.

Fig. 4 of the drawing is illustrative of the manner in which non-metallic refractories may be bonded to other non-metallic refractories in accordance with my invention. Such materials are bonded by inserting therebetween two or more shims of the metals including titanium and zirconium as well as an alloying metal. For example, a satisfactory bond is obtained if, between the members to be bonded together, there is inserted a shim of titanium and a shim of nickel. The members and the shims are then held in contact and heated to approximately 955° C. until a liquidus is formed and then allowed to cool. As previously described, a lower melting point eutectic liquidus may be obtained by adding a third shim or using a shim of an alloy of zirconium and titanium to form a bond consisting of an alloy of zirconium and titanium and a metal such as nickel between the members. Shims of a eutectic alloy of metal from the titanium group and alloying metal may be used, thereby necessitating the placing of only one shim between the non-metallic refractories.

The bonds and the methods of forming these bonds, specifically described in the preceding paragraphs, are given merely by way of example. A number of other bonds have been formed by placing shims of bonding materials between the parts to be joined together in accordance with my invention. Further examples of the composition of suitable bonding materials or alloys and the approximate temperature at which the eutectic liquidus is formed, are tabulated in Table I.

TABLE I

*Eutectic alloy melt temperatures*

| Bonding Alloy | Approximate Melt Temperature, °C. |
|---|---|
| Ti-Cu | 875 |
| Ti-Ni | 955 |
| Ti-Fe | 1,080 |
| Zr-Cu | 885 |
| Zr-Ni | 960 |
| Zr-Fe | 934 |
| Ti-Zr-Ni | 900 |
| Ti-Mo-Zr | 1,000 |
| Ti-Zr-Fe-Ni | 900 |
| Ti-Zr-Fe-Cr | 900 |
| Ti-Zr-Fe-Ni-Co | 900 |
| Ti-Zr-Fe | 900 |
| Ti-Pt | 1,200 |

It will be noted from Table I, that the temperatures at which a liquidus is formed are very much below the melting point of any one of the component alloying metals and the softening point of a large number of non-metallic refractories. Therefore, a very satisfactory bond is obtained without heating the metal members to a point at which the vapor pressure becomes appreciable and without heating the non-metallic refractory members to temperatures at which they soften. This is particularly desirable in the construction of vacuum tubes since the contaminating or deforming effects which accompany the heating of tube parts very close to their melting temperature are avoided. It has been observed that once the eutectic liquidus is formed, higher temperature heating is not harmful but only causes the alloy to become rich in parent metal and thus the alloy will completely melt only at a higher temperature than that to which it was originally heated.

Moreover, by proper selection of alloying metals a bond may be produced that has very nearly the same coefficient of expansion as that of the members to be bonded together. For example, ceramics have been developed which have a thermal coefficient of expansion very nearly that of titanium metal. By using the proper proportions by weight of zirconium and iron shims to form a titanium-zirconium-iron alloy between such a ceramic member and a titanium member, a bond is formed having essentially the same coefficient of expansion as the members which are bonded together.

For example, a bond between a titanium tube part and a ceramic tube part of forsterite may be formed by inserting between the parts a 0.3 mil shim of zirconium and a 0.25 mil shim of iron and heating to a temperature of approximately 1000° C. The resulting titanium-zirconium-iron bond will have a thermal coefficient of expansion of approximately 10 parts/million since titanium has a thermal coefficient of expansion of 10 parts/million, zirconium 6 parts/million, iron 12 parts/million and forsterite ceramic 10 parts/million.

Similarly, alloys of at least one metal from the titanium group, in combination with metals or alloys of metals such as nickel, molybdenum, iron-nickel, iron-chromium, and iron-nickel-cobalt may be used to form low melting point alloy bonds which have thermal coefficients of expansion approximately the same as that of the members to be bonded together and which form at temperatures well below the softening point of commonly used non-metallic refractory materials. The particular alloy selected is determined by the characteristics of the materials to be bonded together.

The non-metallic refractories frequently used in electron tube manufacture are tabulated in Table II along with the temperature range at which they are formed. The formation temperature and/or softening temperature of a ceramic depends not only on the base material, but also on the type and variety of flux used. All of the below-mentioned ceramics are satisfactory for use in electron tubes since they have thermal coefficients of expansion sufficiently close to the thermal coefficients of expansion of metal suitable for use in the construction of electron tubes.

TABLE II

*Ceramics*

| Class of Ceramic | App. Chem. Composition | Usual Maturing Temp. (Firing), °C. |
|---|---|---|
| Corundum | $(Al_2O_3)$ | 1,400–1,700 |
| Forsterite | $(2MgO \cdot 1SiO_2)$ | 1,200–1,400 |
| Steatite | $(1MgO \cdot 1SiO_2)$ | 1,200–1,300 |
| Beryllia | $(BeO)$ | 1,400–1,800 |
| Zircon (+ Talc) | $ZrO_2 \cdot SiO_2 (+MgO$ and $Al_2O_3)$ | 1,200–1,350 |

Referring to Fig. 5 of the drawing, there will be described an application of my invention to the construction of a miniature triode. Fig. 5 of the drawing shows a triode consisting of anode 1, ceramic spacer 2, grid connector 3, grid 4, ceramic spacer 5, cathode assembly 6, cathode connector 7, ceramic spacer 8, and heater connector 9. Members 1, 3, 4, 7 and 9 as well as cathode 6 are made of titanium metal. Cathode 6 is electrically connected to cathode connector 7 by means of a thin conductive film which is formed on the lower side of ceramic spacer 5. Ceramic members 2, 5 and 8 are selected from a variety of ceramic having a thermal coefficient of expansion very nearly that of titanium. The tube is formed by stacking the members in the illustrated order with shims of zirconium and nickel between the parts at the points marked 11. In this particular application, the zirconium shim material is approximately 0.3 mil thick and the nickel shim material is approximately 0.25 mil thick. The assembled tube parts and shims are held together and placed in a chamber. The chamber is evacuated to a pressure less than 1 micron and the tube parts and shims are then heated to a temperature exceeding 900° C. by conventional induction heating apparatus. Shortly after the tube structure reaches a temperature approximately 900° C., the shim material is completely melted into a eutectic liquidus and hermetically seals the tube joints.

The tube structure is then allowed to cool in vacuum until the liquidus solidifies. The construction of miniature tubes, such as the tube of Fig. 5, is more fully described and is claimed in my copending application Serial No. 464,126, filed October 22, 1954, and assigned to the assignee of this invention.

A tube formed in this fashion is very nearly completely free from contamination from evaporated metal. The vapor pressure is less than one one-thousandth of a micron for nickel at 1000° C., titanium at 1200° C., and zirconium at 1400° C. Therefore, there is negligible evaporation of the nickel, titanium or zirconium. The eutectic bonding material which consists of an alloy of titanium, zirconium and nickel has a thermal coefficient of expansion which is very nearly that of the titanium and ceramic and is formed at a temperature well below the softening point of the ceramic. Thus, there is formed a bond, all parts of which have approximately the same thermal coefficient of expansion which is desirable in the construction of tubes of the type illustrated in Fig. 5 of the drawing, and becomes increasingly desirable as the tube size increases.

The method of bonding of my invention has proved particularly advantageous in the construction of vacuum tubes. Since the shims of the alloying and bonding metal are cut from foil of known thickness, complete control of the quantity of melted liquid is obtained. There is no excess metal to be eliminated and the joint resulting is of uniform thickness. Therefore, the tendency toward weak spots and leaks which is inherent in a bond of non-uniform thickness is avoided. Since no gases are formed or liberated during sealing of a bond formed of shims in accordance with my invention, it is not necessary to degas the tube which is the case when metals are applied in the form of a slurry of titanium hydride and a solder metal.

The bond formed in accordance with the method of my invention may be obtained by heating the parts in any atmosphere which is relatively inert to the metals of the group including zirconium and titanium. For example, the parts may be bonded in an atmosphere of argon, helium or in a vacuum. The heat may be applied in any suitable fashion.

Satisfactory bonds can be formed with alloys including any of the metals from the group of titanium, zirconium, hafnium and thorium in combination with metals which have a eutectic melting point below the melting point of any one of the alloying metals, since all of the metals in the titanium group have similar chemical and metalurgical properties. Titanium and zirconium are of major interest in the construction of vacuum tubes and are also most available, therefore, Table I has been limited to alloys of titanium and zirconium. It is noted that metals used in the construction of electron tubes are generally selected from those metals which in combination with metals of the titanium group form alloys at temperatures well below the melting point of any one of the alloy metals and below the temperature at which the vapor pressure of any one of the alloy metals becomes appreciable.

While particular embodiments of the invention have been described it will be obvious to those skilled in the art that various changes and modifications may be made without departing from the invention in its broader aspects and, therefore, the appended claims are intended to cover all such changes and modifications as fall within the true spirit and scope of the invention.

What I claim as new and desire to secure by Letters Patent of the United States is:

1. The method of making a bond between a metal member and a non-metallic body by means of a metal shim member which comprises placing said members and said body in a stack with said metal shim member interposed between said metal member and said body, one of said members consisting essentially of a metal selected from the group consisting of titanium, zirconium, hafnium, thorium and alloys of more than one metal of said group and the other of said metal members consisting essentially of a metal selected from the group consisting of copper, nickel, iron, molybdenum, chromium, platinum, cobalt and alloys of more than one metal of said group, heating the stack in a non-reactive atmosphere to a temperature at least equal to the melting point of the eutectic alloy of the metal member and the metal shim member and below the melting point of both of said members to form in place a molten reactive alloy which wets the non-metallic refractory body and cooling the stack to provide a bond capable of withstanding a temperature substantially equal to that at which the bond was formed.

2. The method of making a vacuum tight bond between a metal member and a hollow cylindrical non-metallic body by means of a continuous annular metal shim member which comprises placing said members and said body in a stack with said metal shim member interposed between said metal member and an annular end of said body, one of said members consisting essentially of a metal selected from the group consisting of titanium, zirconium, hafnium, thorium and alloys of more than one metal of said group and the other of said metal members consisting essentially of a metal selected from the group consisting of copper, nickel, iron, molybdenum, chromium, platinum, cobalt and alloys of more than one metal of said group, heating the stack in a non-reactive atmosphere to a temperature at least equal to the melting point of the eutectic alloy of the metal member and the metal shim member and below the melting point of both of said members to form in place a molten reactive alloy which wets the non-metallic refractory body and cooling the stack to provide a bond capable of withstanding a temperature substantially equal to that at which the bond was formed.

3. The method of making a bond between a metal member and a non-metallic body by means of a metal shim member which comprises placing said members and said body in a stack with said metal shim member interposed between said metal member and said body, one of said members consisting essentially of a metal selected from the group consisting of titanium, zirconium, hafnium, thorium and alloys of more than one metal of said group, and the other of said metal members consisting essentially of a metal selected from the group consisting of copper, nickel, iron, molybdenum, chromium, platinum, cobalt and alloys of more than one metal of said group, heating the stack in a non-reactive atmosphere to a temperature at least equal to the melting point of the eutectic alloy of the metal member and the metal shim member and below the melting point of both of said members to alloy all of the shim member with said metal member and form in place a molten reactive alloy which wets the non-metallic refractory body and cooling the stack to provide a bond capable of withstanding a temperature substantially equal to that at which the bond was formed, and determining the relative amounts of the constituents of the bonding alloy layer by the dimensions of the shim member and the temperature at which the bond is made.

4. The method of making a metallic bond between a titanium metal member and a non-metallic body by means of a nickel shim member which comprises placing said members and said body in a stack with said nickel shim member interposed between said titanium metal member and said body, heating the stack in a non-reactive atmosphere to a temperature at least equal to the melting point of the eutectic alloy of titanium and nickel and below the melting point of both titanium and nickel to form in place a molten reactive titanium nickel alloy which wets the non-metallic refractory body and cooling the stack to provide a bond capable of withstanding a temperature substantially equal to that at which the bond was formed.

5. The method of making a metallic bond between a copper member and a non-metallic body by means of a titanium shim member which comprises placing said members and said body in a stack with said titanium shim member interposed between said copper member and said body, heating the stack in a non-reactive atmosphere to a temperature at least equal to the melting point of the eutectic alloy of copper and titanium and below the melting point of both of said members to form in place a molten reactive copper titanium alloy which wets the non-metallic refractory body and cooling the stack to provide a bond capable of withstanding a temperature substantially equal to that at which the bond was formed.

References Cited in the file of this patent

UNITED STATES PATENTS

| Number | Name | Date |
|---|---|---|
| 2,351,798 | Alexander | June 20, 1944 |
| 2,454,270 | Braunsdorff | Nov. 23, 1948 |
| 2,496,346 | Haayman | Feb. 7, 1950 |
| 2,509,020 | Stauffer | May 23, 1950 |
| 2,570,248 | Kelley | Oct. 9, 1951 |
| 2,619,432 | Hosmer | Nov. 25, 1952 |
| 2,667,432 | Nolte | Jan. 26, 1954 |
| 2,686,958 | Eber | Aug. 24, 1954 |
| 2,739,375 | Coxe | Mar. 27, 1956 |